(12) United States Patent
Jiang et al.

(10) Patent No.: US 11,280,343 B2
(45) Date of Patent: Mar. 22, 2022

(54) BEARING INSTALLATION AND FIXATION STRUCTURE AND COMPRESSOR

(71) Applicants: GREE ELECTRIC APPLIANCES (WUHAN) CO., LTD, Wuhan (CN); GREE ELECTRIC APPLIANCES, INC. OF ZHUHAI, Zhuhai (CN)

(72) Inventors: Nan Jiang, Zhuhai (CN); Zhiping Zhang, Zhuhai (CN); Ruixing Zhong, Zhuhai (CN); Caiyun Jiang, Zhuhai (CN); Yuhui Chen, Zhuhai (CN); Yi Zhou, Zhuhai (CN); Liandong Lei, Zhuhai (CN); Zengyue Liu, Zhuhai (CN); Jian Chen, Zhuhai (CN); Xinwang Ouyang, Zhuhai (CN)

(73) Assignees: GREE ELECTRIC APPLIANCES (WUHAN) CO., LTD, Wuhan (CN); GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 45 days.

(21) Appl. No.: 16/762,228

(22) PCT Filed: Dec. 28, 2017

(86) PCT No.: PCT/CN2017/119456
§ 371 (c)(1),
(2) Date: May 7, 2020

(87) PCT Pub. No.: WO2019/090939
PCT Pub. Date: May 16, 2019

(65) Prior Publication Data
US 2020/0362873 A1 Nov. 19, 2020

(30) Foreign Application Priority Data
Nov. 13, 2017 (CN) .......................... 201711118125.4

(51) Int. Cl.
*F04D 29/056* (2006.01)
*F04D 29/053* (2006.01)
(Continued)

(52) U.S. Cl.
CPC ......... *F04D 29/056* (2013.01); *F04D 29/053* (2013.01); *F04D 29/284* (2013.01);
(Continued)

(58) Field of Classification Search
None
See application file for complete search history.

(56) References Cited

U.S. PATENT DOCUMENTS 10,309,455 B2 * 6/2019 Obara .................... F16C 19/06

FOREIGN PATENT DOCUMENTS

| CN | 2228385 Y | 6/1996 |
| CN | 104218721 A | 12/2014 |

(Continued)

OTHER PUBLICATIONS

International Search Report for corresponding International App. No. PCT/CN2017/119456, dated Aug. 9, 2018, 2 pages.

*Primary Examiner* — Juan G Flores
(74) *Attorney, Agent, or Firm* — Armstrong Teasdale LLP

(57) ABSTRACT

Some embodiments of the disclosure provide a bearing installation and fixation structure and a compressor. The bearing installation and fixation structure includes: a rotatable shaft (7); a bearing (6), provided on the rotatable shaft (7) in a sleeving manner; and an axial locating member, provided on the rotatable shaft (7) in a sleeving manner and including a fixing connecting section (1) and an axial locating section (2) that are integrated with each other; the fixing connecting section (1) is detachably fixed on the rotatable shaft (7); and the axial locating section (2) limits a position of the bearing (6) axially.

13 Claims, 2 Drawing Sheets

(51) Int. Cl.
  *F04D 29/28*  (2006.01)
  *F04D 29/62*  (2006.01)
  *F04D 29/60*  (2006.01)
  *F16C 19/06*  (2006.01)

(52) U.S. Cl.
  CPC .......... *F04D 29/601* (2013.01); *F04D 29/624* (2013.01); *F05D 2240/50* (2013.01); *F05D 2240/60* (2013.01); *F05D 2260/96* (2013.01); *F16C 19/06* (2013.01)

(56) References Cited

FOREIGN PATENT DOCUMENTS

| | | | |
|---|---|---|---|
| CN | 204171602 U | 2/2015 | |
| CN | 104385630 A | 3/2015 | |
| CN | 204372405 U | 6/2015 | |
| CN | 204664412 U | 9/2015 | |
| CN | 106460653 A | 2/2017 | |
| WO | WO-2014126521 A1 * | 8/2014 | .............. F16C 19/54 |

* cited by examiner

BEARING INSTALLATION AND FIXATION STRUCTURE AND COMPRESSOR

CROSS-REFERENCE TO RELATED APPLICATIONS

The present disclosure is a national stage application of International Patent Application No. PCT/CN2017/119456, filed on Dec. 28, 2017, and claims priority to Chinese patent application No. 201711118125.4 filed on Nov. 13, 2017 and entitled "Bearing Installation and Fixation Structure and Compressor," the contents of which are hereby incorporated by reference in their entirety.

TECHNICAL FIELD

The disclosure relates to a technical field of compression devices, and in particular to a bearing installation and fixation structure and a compressor.

Background

A centrifugal compressor is a machine for generating a pressure difference by virtue of a rotational speed, and has a high demand on the stability of the rotational speed. A part on a rotatable shaft needs to be located and locked reliably to guarantee a fitting allowance with a shaft. Generally, to implement location and lock of one part, two parts are required. With a bearing as an example, it is necessary to cooperate a locating ring and a locking nut for location, wherein the locating ring and the shaft are often in transition fit or interference fit to guarantee the requirement on the fitting allowance. In case of many parts, the parts required for location and lock are increased, which results in that an axial length of the rotatable shaft is increased, the rigidity of the shaft is reduced, the critical rotational speed is lowered, the vibration of the rotatable shaft in operation is increased, and the service life of the shaft and the part cooperated with the shaft is shortened. Moreover, with such an installation manner, it is possible to cause an insufficient axial installation space because of a strict requirement on space distribution among several parts to be located and locked.

The bearing and a comb sealing part are both the parts cooperated with a high-speed rotatable shaft. Generally, the axial installation distance is very close, and the distance between the bearing and the comb sealing part does not meet the assembly in which two locating and locking parts are respectively used. Due to the problem of difficult installation, in the art known to the inventors, a form of one long locating ring and one locking nut is often used to meet the locating and locking requirements on the two parts. Similarly, although such a structural design meets the assembly requirement, a separate screwed locking cooperation area needs to be machined, which also results in that the axial length of the rotatable shaft is too large, and the rigidity and critical rotational speed of the rotatable shaft are reduced.

A rotational speed of the high-speed rotatable shaft often reaches to tens of thousands of revolutions; and the bearing, the comb sealing part and the like that are cooperated with the rotatable shaft need to have very high concentricity, perpendicularity and other assembly allowance requirements with the rotatable shaft. Otherwise, the problem of wear occurs easily. When these parts are assembled by using separate locating and locking parts, due to an inconsistent assembly benchmark, a very high assembly technology is required to control an accumulated assembly error within a required range and thus the assembly is difficult.

SUMMARY

Some embodiments of the present disclosure provide a bearing installation and fixation structure and a compressor, which guarantee the consistency of an assembly benchmark of a part on a shaft, and reduce the assembly difficulty of the part on the shaft.

According to some embodiments of the disclosure, a bearing installation and fixation structure is provided, which includes:

a rotatable shaft;

a bearing, provided on the rotatable shaft in a sleeving manner; and an axial locating member, provided on the rotatable shaft in a sleeving manner and including a fixing connecting section and an axial locating section that are integrated with each other, wherein the fixing connecting section is detachably fixed on the rotatable shaft, and the axial locating section obstructs a position the bearing axially.

In an exemplary embodiment,
the fixing connecting section includes an internal thread; and the axial locating section includes an unthreaded hole section.

In an exemplary embodiment, the fixing connecting section includes an internal thread.

In an exemplary embodiment, the axial locating section includes an unthreaded hole section.

In an exemplary embodiment, the axial locating member is a step shaft which is hollow, the fixing connecting section is located on a large-diameter section of the step shaft, and the axial locating section is located on a small-diameter section of the step shaft.

In an exemplary embodiment, a peripheral sealing surface is formed at an outer periphery of the large-diameter section.

In an exemplary embodiment, the step shaft includes a plurality of steps, and the peripheral sealing surfaces are formed at outer peripheries of at least two steps, having a diameter greater than a diameter of a smallest-diameter section, of the step shaft.

In an exemplary embodiment,
intermediate connecting diameter section which is conical is provided between the small-diameter section and the large-diameter section; or one end of the large-diameter section is connected with one end of the small-diameter section.

In an exemplary embodiment, a projection of the peripheral sealing surface on a central axis of the axial locating member and a projection of the fixing connecting section on the central axis of the axial locating member are at least partially overlapped.

In an exemplary embodiment, a peripheral sealing surface is formed at an outer periphery of the fixing connecting section.

In an exemplary embodiment, an axial end surface of the axial locating member is abutted against an axial end surface of the bearing.

In an exemplary embodiment, the bearing installation and fixation structure further includes a sealing member, and the sealing member is provided on the large-diameter section in a sleeving manner and cooperated with the peripheral sealing surface in a sealing manner.

In an exemplary embodiment, the axial locating section and the rotatable shaft are in transition fit or interference fit.

According to some embodiments of the disclosure, a compressor is provided, which includes the above-mentioned bearing installation and fixation structure.

By applying the technical solutions of some embodiments of the disclosure, an axial locating member is integrally formed, the axial locating member includes a fixing connecting section and an axial locating section, and an end portion of the axial locating section is provided with a locating end surface. The axial locating member includes a connecting structure and a locating structure simultaneously, so that its own fixation and the location to other parts are implemented simultaneously, and the manner in which the axial location to other parts needs locating and locking parts in a device known to the inventors is changed into one axial locating member. Therefore, some embodiments of the disclosure reduce a number of parts, improve a quality control, reduce an axial length of a rotatable shaft, and accelerate the rigidity, stability and critical rotational speed of the rotatable shaft. As the axial locating member is of an integral structure and includes the connecting structure and the locating structure, the assembly benchmark is unified for the installation and fixation of the other parts by means of the integral axial locating member to reduce the assembly difficulty and improve a assembly precision.

The above are merely an overview for the technical solutions of some embodiments of the disclosure. In order to know the technical means of the disclosure more clearly and implement according to a content in the specification, the description is made hereinafter with some embodiments of the disclosure and in combination with the accompanying drawings.

Herein, the drawings include the following drawing markers:

1, fixing connecting section; 2, axial locating section; 3, internal thread; 4, peripheral sealing surface; 5, intermediate connecting section; 6, bearing; 7, rotatable shaft; and 8, sealing member.

DETAILED DESCRIPTION OF THE EMBODIMENTS

In order to further elaborate the technical means adopted to achieve the predetermined purpose of the disclosure and the effects, the specific embodiments, structures, features and effects of the disclosure are described below in detail in combination with the accompanying drawings and embodiments. In the following description, different "one embodiment" or "embodiments" unnecessarily refer to the same embodiment. In addition, the specific characteristics, structures, or features in one or more embodiments are combined in any appropriate form.

The disclosure is further described below in detail in combination with the accompanying drawings and specific embodiments. However, such a description is not intended to limit the disclosure.

Figure 1:
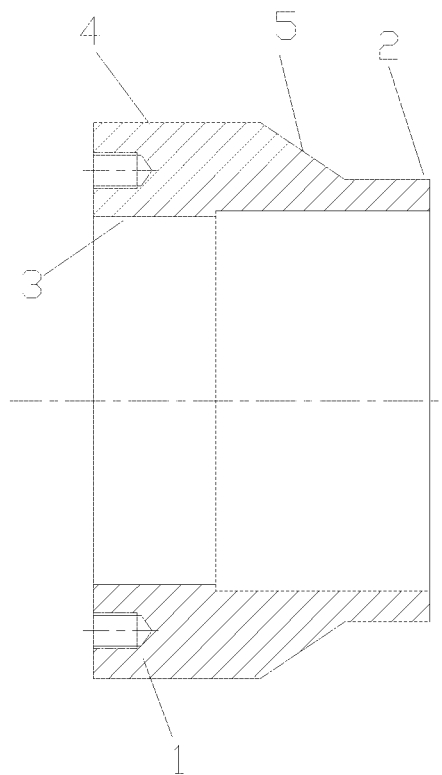
FIG. 1 illustrates a structural schematic diagram of an axial locating member of a bearing installation and fixation structure according to a first embodiment of the disclosure.
Figure 2:
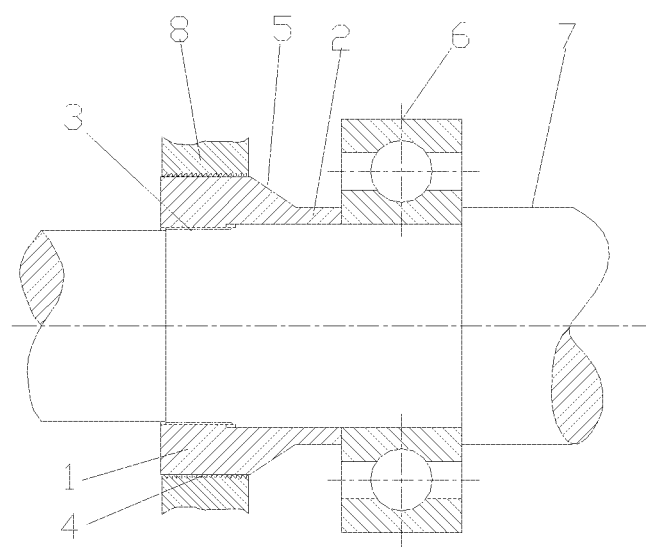
FIG. 2 illustrates a schematic diagram of a bearing installation and fixation structure according to a first embodiment of the disclosure.
Figure 3:
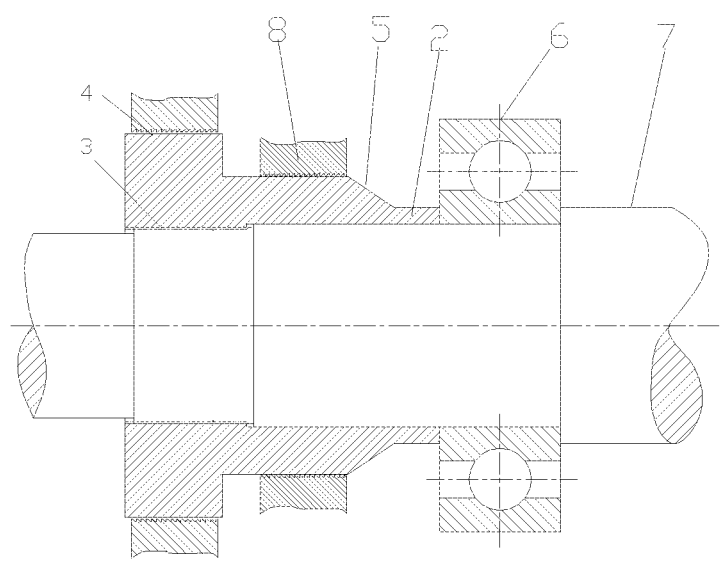
FIG. 3 illustrates a schematic diagram of a bearing installation and fixation structure according to a second embodiment of the disclosure.

Referring to FIG. 1 to FIG. 3, according to a first embodiment of the disclosure, a bearing installation and fixation structure includes a rotatable shaft 7, a bearing 6, and an axial locating member for axially locating the bearing 6; the bearing 6 and the axial locating member are both provided on the rotatable shaft 7 in a sleeving manner; the axial locating member is integrally formed; the axial locating member includes a fixing connecting section 1 and an axial locating section 2; the fixing connecting section 1 is fixedly connected with the rotatable shaft 7; and an end portion of the axial locating section 2 is provided with a locating end surface and cooperated with the bearing 6.

The axial locating member includes a connecting structure and a locating structure simultaneously, so that its own installation and fixation on a rotatable shaft 7 and a location to other parts are implemented, and the manner in which an axial location to other parts needs both locating and locking parts in the device known to the inventors is changed into one axial locating member. Therefore, some embodiments of the disclosure reduce a number of parts, improve a quality control, reduce an axial length of the rotatable shaft, and accelerate the rigidity, stability and critical rotational speed of the rotatable shaft. As the axial locating member is of an integral structure and includes the connecting structure and the locating structure, the assembly benchmark is unified for the installation and fixation of the other parts by means of the integral axial locating member to reduce a assembly difficulty and improve a assembly precision.

In some exemplary embodiments, it is particularly to be noted that the axial locating member is formed integrally, so when the axial locating member is installed and cooperated with the rotatable shaft 7, the axial locating member is directly and coaxially cooperated and installed with the rotatable shaft 7 as a whole. Compared with the situation in which a split structure is located and locked separately in the art known to the inventors, such a structure prevents an irregular offset in a locking process of the two parts, and also eliminate an coaxial error caused by the offset. In other words, by forming the axial locating member integrally, the parts are reduced, the coaxiality between the axial locating member and the rotatable shaft 7 is further guaranteed, the rotational fluctuation is greatly reduced, and a stability of the overall structure is effectively improved.

In some exemplary embodiments, the fixing connecting section 1 of the axial locating member includes an internal thread 3, and, the axial locating section 2 includes an unthreaded hole section. In some exemplary embodiments, the fixing connecting section 1 includes an internal thread. In some exemplary embodiments, the axial locating section 2 includes an unthreaded hole section. In this embodiment, a threaded hole is machined at the inner periphery of a first end of the axial locating member, a screw thread is machined in a threaded area of the threaded hole, and the axial locating member implements the fixed connection with the rotatable shaft 7 by the screw thread. An unthreaded hole is formed at the inner periphery of a second end of the axial locating member. The axial locating member implements the transition fit or interference fit with the rotatable shaft 7 by the unthreaded hole, so as to guarantee the coaxiality between the axial locating member and the rotatable shaft 7. A locating end surface is formed on an end surface of the second end of the axial locating member. An end surface cooperation is formed between the axial locating member and a to-be-located part installed on the rotatable shaft 7 by the locating end surface, thus forming the axial location to the to-be-located part. The locating end surface guarantees the axial location precision of the axial locating member to the to-be-located part more effectively.

In some embodiments, the axial locating member is a step shaft which is hollow, the fixing connecting section 1 is located on a large-diameter section, and the axial locating section 2 is located on a small-diameter section. The fixing connecting section 1 is configured to implement the fixed connection between the axial locating member and the rotatable shaft 7, and the axial locating section 2 is configured to implement the axial location to the to-be-located part, so by disposing the fixing connecting section 1 on the large-diameter section and the axial locating section 2 on the small-diameter section, a fixing connecting structure between the axial locating member and the rotatable shaft 7 is guaranteed effectively, and the structural strength at a cooperated position between the axial locating member and the rotatable shaft 7 is improved. Meanwhile, as the axial locating section is mainly stressed from an axial direction, and has a small acting force from a radial direction, so that the axial locating section 2 is located on the small-diameter section, which guarantees the axial locating precision of the axial locating section 2 to the to-be-located part and prevents the adverse effect to the structural strength of an axial locating structure of the axial locating section 2, and further reduces the material consumption of the axial locating section 2, saves the material and reduces the cost of the axial locating member.

In some embodiments, an inner periphery of the axial locating section 2 is a cylindrical surface, uses an assembly manner of being in clearance fit or interference fit with the outer cylindrical surface of one end of the rotatable shaft 7 and is assembled in a jacket heating process, thus guaranteeing the coaxiality between the axial locating member and the rotatable shaft 7. In some embodiments, the locating end surface of the axial locating section 2 is a plane perpendicular to a central axis of the axial locating section 2, to implement the axial location to the to-be-located part more conveniently. The outer periphery of the axial locating member is the cylindrical surface, and is used to cooperate with the inner cylindrical surface of the bearing or the inner cylindrical surface of a sealing member 8 instead of a shaft.

In some embodiments a peripheral sealing surface is formed at an outer periphery of the fixing connecting section 1. In this embodiment, the peripheral sealing surface 4 is formed at an outer periphery of the large-diameter section. Since a diameter of the large-diameter section is greater than a diameter of the small-diameter section, the formation of the peripheral sealing surface 4 at the outer periphery of the large-diameter section effectively prevents an interference of the small-diameter section to a sealing cooperation structure between the sealing member 8 and the peripheral sealing surface 4, and effectively guarantees the sealing cooperation effect between the sealing member 8 and the peripheral sealing surface 4. Meanwhile, as the large-diameter section has the large diameter, the fixing connecting section 1 has a large wall thickness. Even though the peripheral sealing surface 4 is machined at the outer periphery of the large-diameter section, there is also no large adverse effect to the structural strength of the fixing connecting section 1. It is further to be noted that since the axial locating member is formed integrally, the particularity of the structure greatly reduces a fluctuation of the peripheral sealing surface 4 due to poor concentricity when the axial locating member rotates, and greatly reduces a possibility of friction between the peripheral sealing surface 4 of the axial locating member and a sealing comb.

Referring also to FIG. 2, according to the first embodiment of the disclosure, the step shaft is a two-order step, and includes one large-diameter section and one small-diameter section. The small-diameter section is configured to axially locate the to-be-located part, and the large-diameter section is configured to implement connection and fixation between the axial locating member and the rotatable shaft 7. The peripheral sealing surface 4 for forming a sealing structure with the sealing member 8 is provided at the outer periphery of the large-diameter section, so that the sealing effect of a rotatable shaft structure is improved effectively.

Referring to FIG. 3, according to a second embodiment of the disclosure, the step shaft includes a plurality of steps, and the peripheral sealing surfaces 4 are formed at outer peripheries of at least two steps, having a diameter greater than a diameter of the smallest-diameter section, of the step shaft. In the embodiments, the step shaft is a three-order step, and includes one large-diameter section, one intermediate-diameter section and one small-diameter section. The small-diameter section having the smallest diameter is configured to axially locate the to-be-located part. The peripheral sealing surfaces 4 are respectively formed at an outer periphery of the large-diameter section and an outer periphery of the intermediate-diameter section, so that the step shaft is configured for the axial location of a plurality of parts and sealing cooperation with the rotatable shaft. Such a structure is particularly applied to the assembly between a plurality of rotating parts within a short axial distance, solves the problem of difficult assembly, and improves the assembly precision.

In some exemplary embodiments, an intermediate connecting section 5 between the large-diameter section and the small-diameter section is a conical section, or the large-diameter section is directly connected with the small-diameter section.

In some exemplary embodiments, the projection of the peripheral sealing surface 4 on a central axis of the axial locating member and the projection of the fixing connecting section 1 on the central axis of the axial locating member are at least partially overlapped. In this way, the structural characteristic that the axial locating member implements the fixing connection with the rotatable shaft 7 by an inner periphery of the axial locating member and implements the sealing cooperation by a outer periphery of the axial locating member is used fully to make a sealing cooperation portion and a connecting portion of the axial locating member located on a same section.

The bearing installation and fixation structure provided by some embodiments of the disclosure is configured for assembly and location of a plurality of parts (such as the bearing and the comb sealing member) cooperated with the rotatable shaft within a limited axial length. Since a same part is used for the assembly and location, the assembly benchmark is unified. Compared with the assembly and location using a plurality of parts, the accumulated assembly error is greatly reduced; and by limiting a geometric tolerance of the axial locating member, the requirement on high assembly precision of a plurality of parts matched with the rotatable shaft is implemented more easily.

In some exemplary embodiments, the bearing installation and fixation structure further includes the rotatable shaft 7, the bearing 6 and the axial locating member are both provided on the rotatable shaft 7 in a sleeving manner, the fixing connecting section 1 of the axial locating member is fixedly connected with the rotatable shaft 7, and the locating end surface of the axial locating member limits on the end surface of the bearing 6.

In some exemplary embodiments, when the axial locating member is the step shaft which is hollow, and the peripheral sealing surface 4 is formed at the outer periphery of the large-diameter section, the bearing installation and fixation structure further includes the sealing member 8. The sealing member 8 is provided out of the large-diameter section of the axial locating member in a sleeving manner, and cooperated with the peripheral sealing surface 4 in a sealing manner. The sealing cooperation portion and the connecting portion of the axial locating member have different positions on the axial locating member to implement the function, so through a manner of forming the connecting portion at an inner periphery of the fixing connecting section and forming the sealing cooperation portion at an outer periphery of the fixing connecting section, the functions of the sealing cooperation portion and the connecting portion are integrated to a same section of structure, and the structure of the fixing connecting section is utilized more fully and effectively. The fixed connection and sealing of the axial locating member are located on the same section of structure, and do not need to be provided respectively on different shaft sections along the axial direction, so the axial cooperation length between the axial locating member and the rotatable shaft 7 is shortened. While the axial locating member has the axial locating and locking functions, the screwed locking and peripheral sealing surfaces are disposed in a locating structure of which the axial length cannot be shortened, so that the axial length of the rotatable shaft 7 is not increased, and the rotation stability of the rotatable shaft 7 is improved. In some embodiments, the sealing member 8 is a comb structure.

In some exemplary embodiments, the inner periphery of the axial locating section 2 of the axial locating member and the outer periphery of the rotatable shaft 7 are in the transition fit or interference fit.

According to some embodiments of the disclosure, a compressor includes a bearing installation and fixation structure, and the bearing installation and fixation structure is the above-mentioned bearing installation and fixation structure.

The above are some embodiments of the disclosure rather than a limit to the disclosure in any form. Any simple variation, equivalent change and modification made to the above embodiments according to the technical essence of the disclosure still pertain to a scope of the technical solutions of the disclosure.

What is claimed is:

1. A bearing installation and fixation structure, comprising:
    a rotatable shaft;
    a bearing, provided on the rotatable shaft in a sleeving manner; and
    an axial locating member, provided on the rotatable shaft in a sleeving manner and comprising a fixing connecting section and an axial locating section that are integrated with each other, wherein the fixing connecting section is detachably fixing on the rotatable shaft, and the axial locating section obstructs a position of the bearing axially;
    wherein a peripheral sealing surface is formed at an outer periphery of the fixing connecting section.

2. The bearing installation and fixation structure as claimed in claim 1, wherein
    the fixing connecting section comprises an internal thread; and
    the axial locating section comprises an unthreaded hole section.

3. The bearing installation and fixation structure as claimed in claim 1, wherein the axial locating member is a step shaft which is hollow, the fixing connecting section is located on a large-diameter section of the step shaft, and the axial locating section is located on a small-diameter section of the step shaft.

4. The bearing installation and fixation structure as claimed in claim 3, wherein a peripheral sealing surface is formed at an outer periphery of the large-diameter section.

5. The bearing installation and fixation structure as claimed in claim 4, wherein the step shaft comprises a plurality of steps, the bearing installation and fixation structure has a plurality of peripheral sealing surfaces, and the peripheral sealing surfaces are formed at outer peripheries of at least two steps, having a diameter greater than a diameter of a smallest-diameter section, of the step shaft.

6. The bearing installation and fixation structure as claimed in claim 4, wherein a projection of the peripheral sealing surface on a central axis of the axial locating member and a projection of the fixing connecting section on the central axis of the axial locating member are at least partially overlapped.

7. The bearing installation and fixation structure as claimed in claim 4, further comprising a sealing member, wherein the sealing member is provided on the large-diameter section in a sleeving manner and cooperated with the peripheral sealing surface in a sealing manner.

8. The bearing installation and fixation structure as claimed in claim 3, wherein
    an intermediate connecting diameter section which is conical is provided between the small-diameter section and the large-diameter section; or
    one end of the large-diameter section is connected with one end of the small-diameter section.

9. The bearing installation and fixation structure as claimed in claim 1, wherein an axial end surface of the axial locating member is abutted against an axial end surface of the bearing.

10. The bearing installation and fixation structure as claimed in claim 1, wherein the axial locating section and the rotatable shaft are in transition fit or interference fit.

11. The bearing installation and fixation structure as claimed in claim 1, wherein the fixing connecting section comprises an internal thread.

12. The bearing installation and fixation structure as claimed in claim 1, wherein the axial locating section comprises an unthreaded hole section.

13. A compressor, comprising a bearing installation and fixation structure as claimed in claim 1.

\* \* \* \* \*